(12) United States Patent
Van Horssen

(10) Patent No.: US 7,600,951 B2
(45) Date of Patent: Oct. 13, 2009

(54) QUICK CHANGE HOLDER FOR CUTTING TOOL

(76) Inventor: Charles A. Van Horssen, 21622 N. 14th Ave., Phoenix, AZ (US) 85027

( * ) Notice: Subject to any disclaimer, the term of this patent is extended or adjusted under 35 U.S.C. 154(b) by 180 days.

(21) Appl. No.: 11/656,854

(22) Filed: Jan. 23, 2007

(65) Prior Publication Data

US 2007/0116530 A1 May 24, 2007

Related U.S. Application Data

(63) Continuation-in-part of application No. 11/366,139, filed on Mar. 2, 2006, now Pat. No. 7,322,775, which is a continuation-in-part of application No. 11/148,118, filed on Jun. 8, 2005, now Pat. No. 7,153,069.

(51) Int. Cl.
*B23B 27/00* (2006.01)
*B23B 29/00* (2006.01)

(52) U.S. Cl. .............................. 407/70; 407/67; 407/93; 407/94

(58) Field of Classification Search .................. 407/41, 407/66, 67, 93, 94, 70, 48, 40, 53, 103, 33, 407/34, 64
See application file for complete search history.

(56) References Cited

U.S. PATENT DOCUMENTS

| | | | | |
|---|---|---|---|---|
| 3,339,257 A | * | 9/1967 | Hargreaves et al. | 407/38 |
| 3,512,236 A | * | 5/1970 | Renaud | 407/38 |
| 3,535,759 A | * | 10/1970 | Mueller | 407/38 |
| 3,545,318 A | * | 12/1970 | Anderson | 82/158 |
| 3,882,582 A | * | 5/1975 | Williams | 407/37 |
| 4,449,556 A | * | 5/1984 | Colton | 144/230 |
| 4,658,875 A | * | 4/1987 | Grabovac | 144/230 |
| 5,146,963 A | * | 9/1992 | Carpenter et al. | 144/231 |
| 6,004,080 A | * | 12/1999 | Qvarth et al. | 407/36 |
| 7,252,460 B2 | * | 8/2007 | Rieth | 407/113 |

* cited by examiner

*Primary Examiner*—Willmon Fridie
(74) *Attorney, Agent, or Firm*—Frank J. McGue

(57) ABSTRACT

An end mill has a plurality of quick change insert holders for cutter inserts on machine tools. Each of the plurality of quick change tool holders comprises a housing having at least one seat portion which is adapted to receive a cutter insert. A clamping arm is movably mounted in the insert housing and has a clamp portion adapted to engage a cutter insert extending over the seat portion. A locking mechanism is contained within the housing. The locking mechanism has a clamp position which forces the clamp portion of the clamping arm to engage a cutter insert and a release position which forces the clamp portion to disengage from a cutter insert. The locking mechanism moves between the release position and the clamp position.

12 Claims, 3 Drawing Sheets

QUICK CHANGE HOLDER FOR CUTTING TOOL

RELATED APPLICATION

This is a continuation-in-part of patent application Ser. No. 11/366,139 filed Mar. 2, 2006, now U.S. Pat. No. 7,322,775, which is a continuation-in-part of patent application Ser. No. 11/148,118 filed Jun. 8, 2005, now U.S. Pat. No. 7,153,069.

TECHNICAL FIELD

This invention relates generally to the field of cutting tool holders, and, more particularly, to an improved cutting tool holder which avoids the need for tools to change cutting tool inserts thereby providing the ability to quickly change cutting tools as needed in machine shops.

BACKGROUND OF THE INVENTION

In the metal cutting or machining industry, metals and other hard materials are made into a desired finished shape by various cutting operations. The cutting tools used in the industry have sharp edges and are manufactured from materials that are much harder than those being cut. However, the forces involved in cutting metals and other hard materials are substantial and thus the cutting tools and the materials being cut must be held extremely securely with a very high degree of rigidity. In addition, the geometry of the cutting edges of said tools is very broad and strong when compared, for example, to the edge of a knife blade. This very broad edge also further increases the cutting forces required.

There are two general modes of cutting that are performed in the industry. The first is external cutting where material is removed from the exterior surfaces of the raw material or part to be machined. An analogous cutting technique would be peeling an apple.

The second cutting mode in internal cutting where material is removed from surfaces which are surrounded by the material itself such as drilling a hole. Carrying the analogy further, an example of internal cutting is coring the apple.

There are also two general types of machining techniques employed in the industry which can be used for either cutting mode. In the first technique, the material to be machined (hereinafter the "workpiece"), is rotated rapidly and continuously in a lathe spindle. The cutting tool is brought into contact with the rotating workpiece causing removal of material. This technique is known in the industry as turning and the modern lathe is called a turning center.

In the second technique, the workpiece is rigidly held in a fixed position and rapidly rotating cutting tools are brought into contact therewith thereby causing material to be removed. This technique is known as milling and the machine is a milling machine. However, modern machine tools often have both milling and turning capabilities in the same machine. Such dual capable machines are called machining centers.

There are three general shapes of tools in use today. The first shape is the drill and related hole making tools such as reamers and boring bars. Some of the larger tools in this category use inserts described below, but much of the hole making tooling is made from solid materials. Hole making tools are solely used in the internal cutting mode.

The second and most common shape is the insert tool as discussed in the prior applications. Inserts are commonly made from, or coated with, very hard materials such as silicon carbide, ceramic or even diamond. Inserts are made in small flat pieces in the shape of rhomboids, circles, triangles or other polygons. Inserts are often provided with a hole in the center thereof that allows them to be fitting into holders and secured therein with clamps and screws.

As metal cutting proceeds, the insert will wear down and must be periodically replaced with another identical insert. Often times, inserts will have more than one cutting edge or tip that can be used. Thus, the insert can be flipped over, or rotated, or both to bring another tip into use. A square or rhomboid insert can have up to eight tips that can be used until the insert is discarded. While inserts are almost never sharpened for reuse, the inserts are recycled for their cobalt content. In contrast, the insert holder is generally reusable forever.

At present, all insert changes must be performed manually using tools. Since most inserts are held in place with allen screws, it takes a relatively long time to change an insert. There is no automated technique for replacing or realigning such inserts. The operator must be highly skilled to properly change or realign said insert and, conversely, this skill level leads to frequent incorrect installations. Such incorrect installations can lead to significant scrap losses. In addition, both the screws holding said inserts and the threaded holes receiving said screws wear or strip out. As a consequence, operators of insert equipped machinery simply do not like to change inserts.

The third and last shape is an end mill which is essentially a short stout drill that rotates at high speed to cut metal with its sides. End mill tools are used in mills or machining centers and can cut in either the internal cutting or external cutting modes. Larger diameter end mills use a number of inserts as described below. The present invention relates to end mills.

There have been some attempts to address these issues. U.S. Pat. No. 5,683,212 entitled "Clamping Assembly for Tapered Hollow Shank of Tooling System" which issued on Nov. 4, 1997 to Cirino et al. discloses a clamping assembly for a cutter holder tool which includes a button 40 which clamps against a tapered shank so that said tool is urged inwardly by a spring (not shown) seated on the reduced diameter land 60.

U.S. Pat. No. 4,420,280 entitled "Tool Block" which issued on Dec. 13, 1983 to Gustafson shows a tool block for a lever actuated quick release mechanism which is provided with a cutting insert holder 12 and a clamping device comprised of a pivotally arranged lever 20, one end of which acts on the cutting insert holder 12 while the other end of which cooperates with a spring loaded device 21.

U.S. Pat. No. 3,981,607 entitled "Boring Bar with Removable and Indexable Cutting Insert" which issued on Sep. 21, 1976 to Jorgensen has a manual button 100 release mechanism for a cutting insert 12 which may be removed by releasing the pressure applied to the finger 28 through the clamp insert 14 by means of a manual button 100 which, when depressed, will contact the forward end 83 of the wedge shaft 74 thereby forcing the wedge shaft 74 to the right causing the ball 84 and the clamp release pin 60 to drop down.

U.S. Pat. No. 4,210,038 entitled "Lathe Having a Guided Movable Cutter" which issued on Jul. 1, 1980 to Hill provides a cutting tool holder which includes vertical positioning knob 17 and a coarseness selector handle 17 for adjusting the positioning of the cutter holder.

None of the known prior art disclose the combination set forth herein.

SUMMARY OF THE INVENTION

It is an object of this invention to provide an improved holder for quick changes of cutter inserts on rotating end mill tools.

It is a further object of this invention to provide an improved holder which requires no tools or screws for securing or removing an end mill cutter insert.

It is still another object to provide an improved holder for cutting inserts on end mills which can be changed in seconds.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
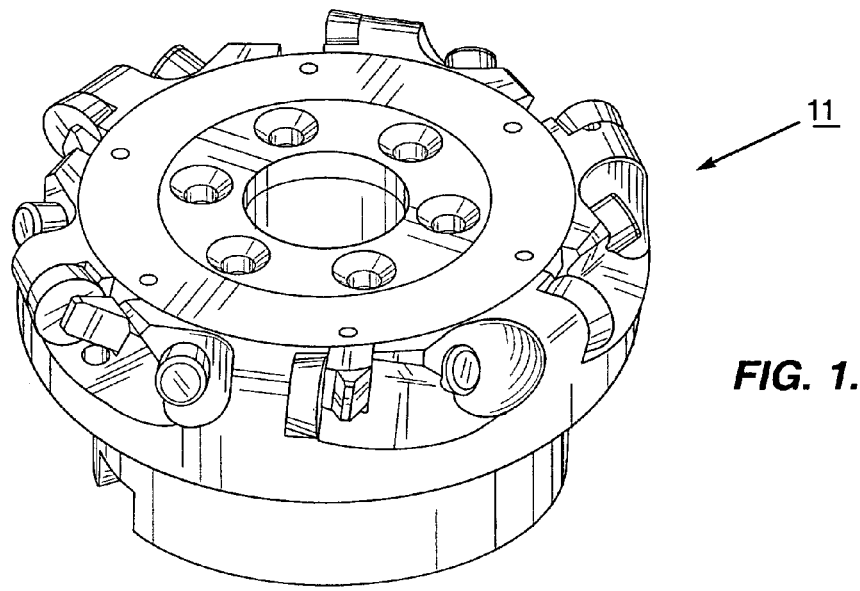
FIG. 1 is a perspective view of an end mill employing the present invention.

Referring more particularly to the drawings by characters of reference, FIG. 1-4 disclose combinations of features which constitute the components of a self contained, toolless quick change tool holder 10 for holding cutter inserts 16 on an end mill machine tool 12. Self contained, toolless quick change tool holder 10 comprises a housing 13 which is adapted to receive and conform to the shape of cutter insert 16. A clamping arm 12 is movably mounted in housing 13. Clamping arm 12 has a clamp portion 22 extending over seat portion 18, clamp portion 22 adapted to engage cutter insert 16. A locking mechanism 15 is completely contained within housing 13 whereby no external tools are needed to actuate said locking mechanism. Locking mechanism 15 has a clamp position best seen in FIG. 3 which forces clamp portion 22 of clamping arm 12 to engage cutter insert 16 and a release position best seen in FIG. 4 which forces clamp portion 22 to disengage from cutter insert 16 to allow removal and replacement of said cutter insert, locking mechanism 15 being movable between the release position and the clamp position without the use of external tools such as allen wrenches and the like.

Figure 2:
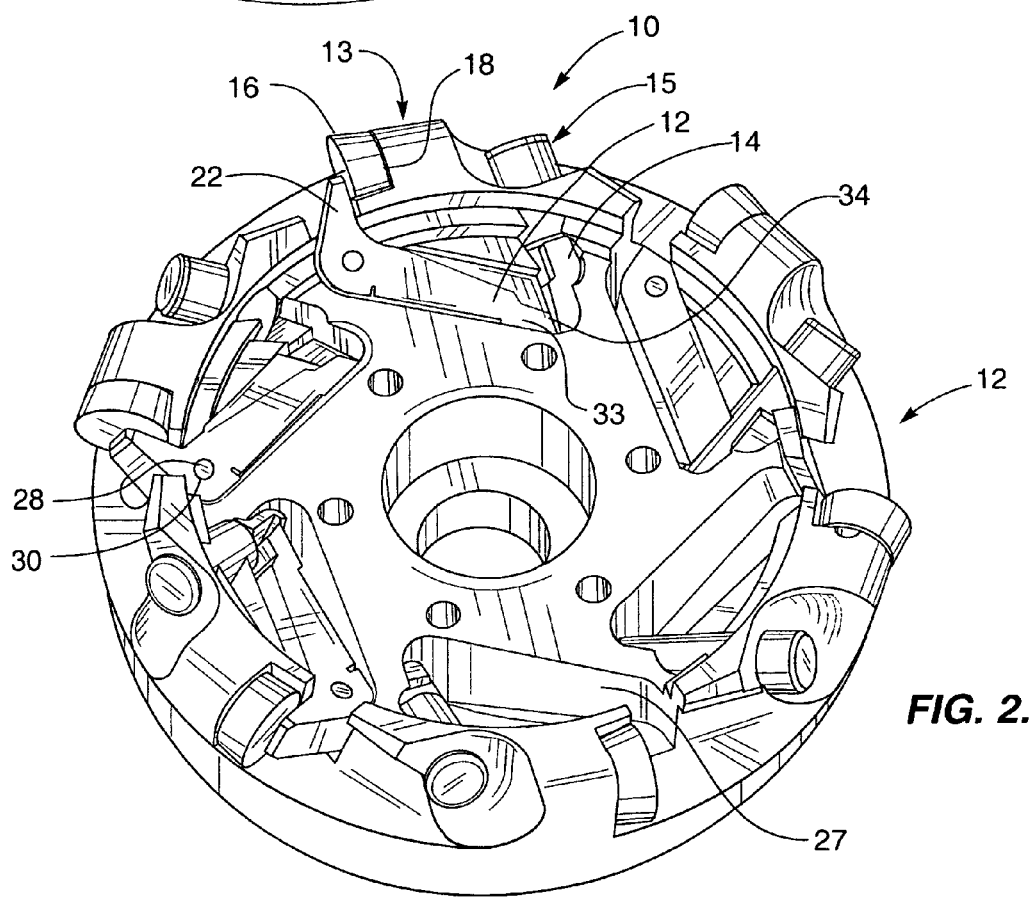
FIG. 2 is a perspective view of an end mill employing the present invention with a cover plate removed.

As best seen in FIG. 2, one embodiment of self contained, toolless quick change tool holder 10 which comprises cutter insert housing 13 with clamping arm 12 thereto. In this embodiment, locking mechanism 15 comprises a clamping arm 12 and cam 14 to speed the process of changing cutter insert 16.

In this example, cutter insert 16 has a circular cross section. To accommodate cutter insert 16, cutter insert housing 13 is positioned in a cutout bench 20 which receives and conforms to the shape of cutter insert 16. As discussed previously, cutter insert 16 can have a multiplicity of shapes. Those skilled in the art will recognize that the present invention is not limited to the illustrated shapes and sizes, but such are exemplary in nature only.

Clamping arm 12 is mounted in a clamping arm slot 27 in insert housing 13. In some embodiments, clamping arm 12 includes an elongated hole 28 through which a pivoting axle 30 extends to allow rotation of clamping arm 12 thereabout from a clamping position shown in FIG. 3 to a release position shown in FIG. 4. Pivoting arm 12 has clamp portion 22 extending from said elongated hole out of clamping arm slot 27 to a position over seat portion 18 and cutter insert 16. In other embodiments, hole 28 is round.

When clamping portion 22 is engaged with cutter insert 16, said clamping portion 22 is pitched at an angle 23 whereby cutter insert 16 is pulled inwards by a portion of the clamping force thereby seating cutter insert 16 firmly in a clamped position. Extending at an angle from elongated hole 28 into clamping arm slot 27 opposite clamp portion 22 is an arm 32 whose distal end 34 of clamping arm 12 rests upon cam 14.

Clamping arm 12 is biased to the release position by a clamping arm leaf spring 36 which is mounted into a channel 38 formed in arm 32 and engaging housing 13. Clamping arm leaf spring 36 is positioned to engage arm 32 between elongated hole 28 and distal end 34.

Cam 14 is generally a linear cylindrical profile which is mounted into insert housing 13 in a cam cavity 42. A button 44 is positioned outside cam cavity 42 at one end of cam 14. The other end of cam 14 engages a cam spring 46 which is a compression spring positioned in cam cavity 42 opposite button 44. Cam cavity 42 and clamping arm slot 27 are connected within insert housing 13 whereby distal end 34 of clamping arm 12 rests upon cam 14.

Figure 3:
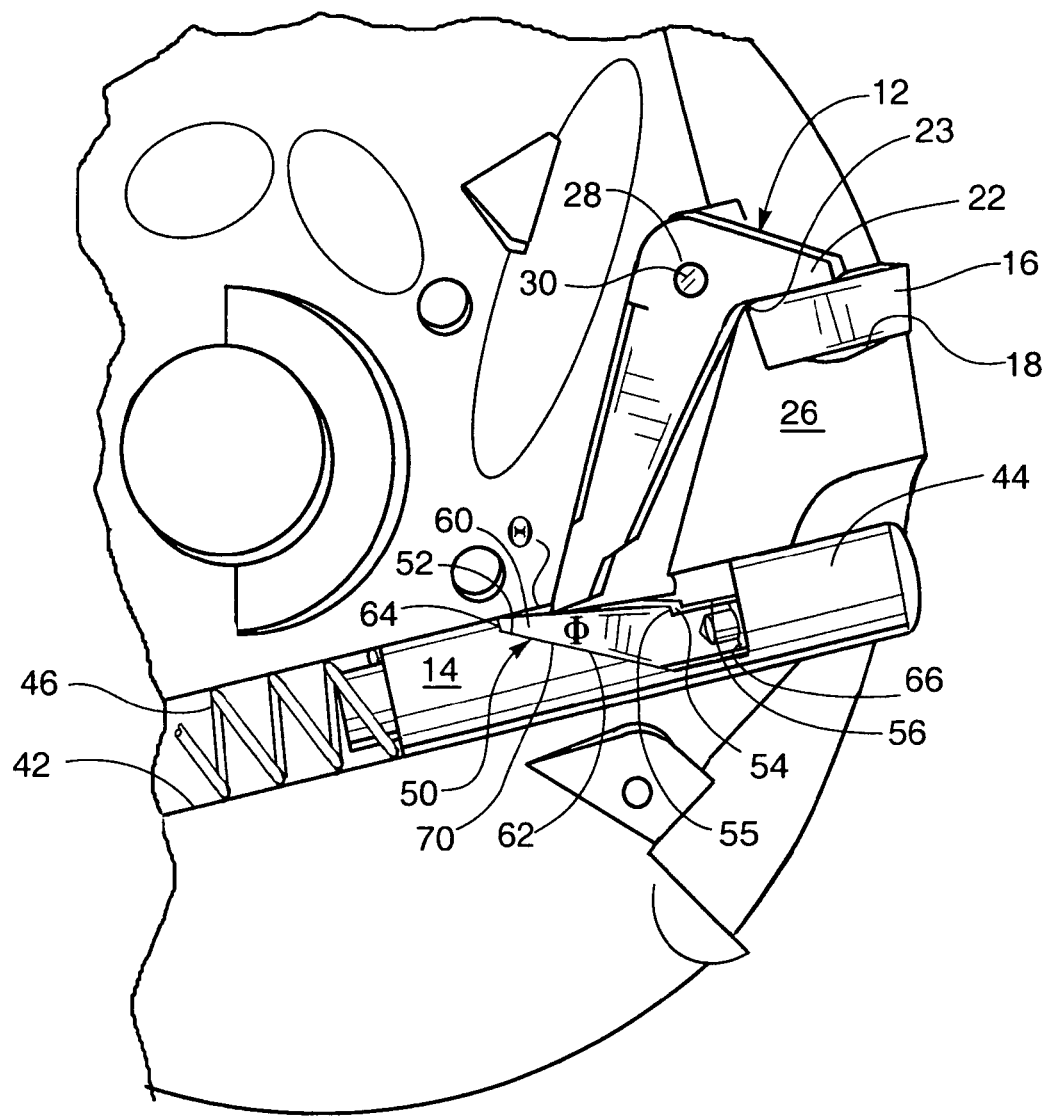
FIG. 3 is a close up of one cutter of FIG. 2 showing the present invention engaged with a cutter insert.
Figure 4:
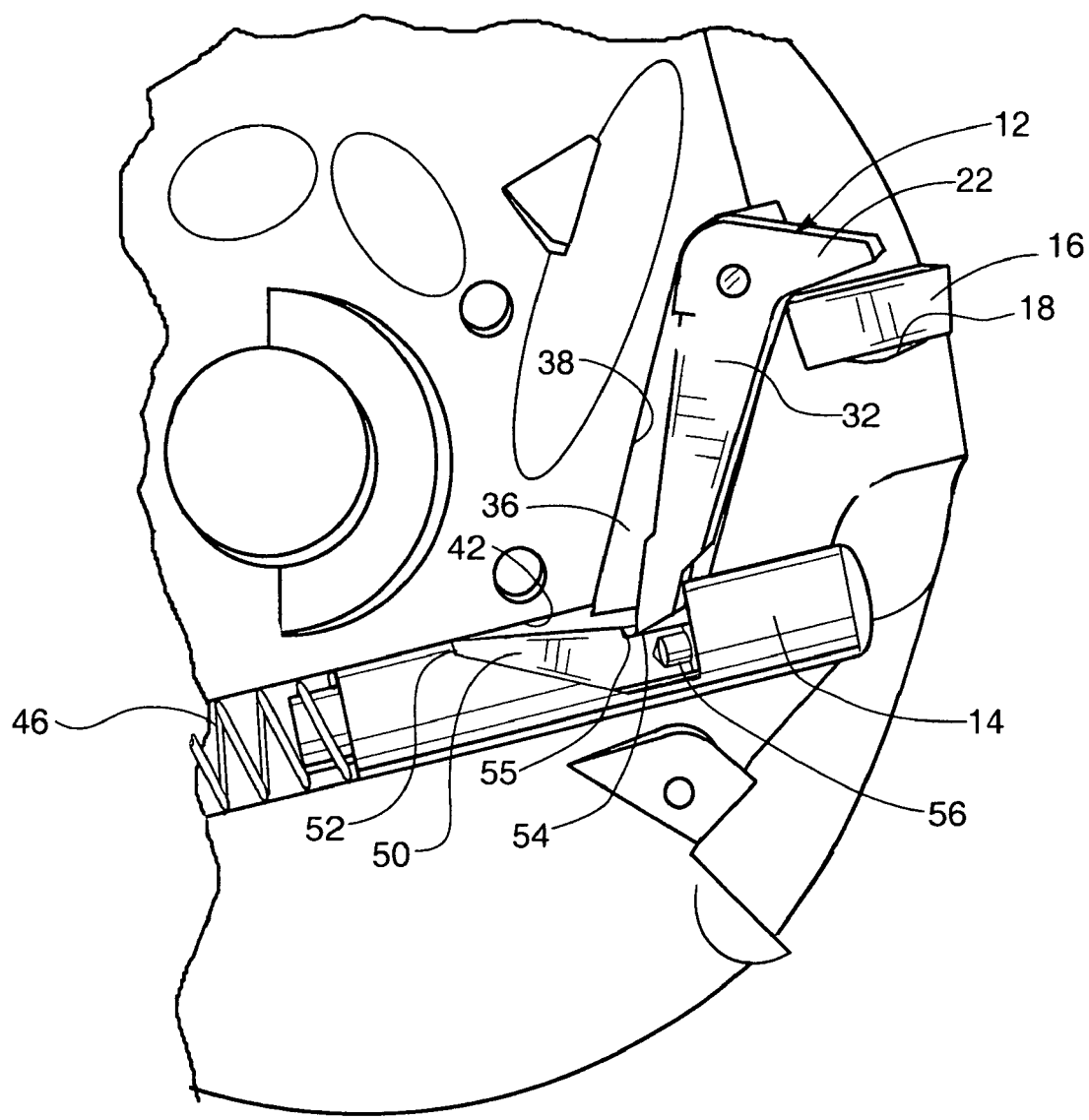
FIG. 4 is a close up of one cutter of FIG. 2 showing the present invention disengaged from a cutter insert.

As best seen in FIGS. 3 and 4, intermediate between button 44 and cam spring 46, cam 14 includes a sloped portion 50 which slopes inwardly at an angle $\Theta$ from a shallow cut 52 proximate to cam spring 46 to a deeper cut 54 in the direction of button 44. A trough 56 extends further into cam 14 from deeper cut 54 proximate to and towards button 44.

Cam spring 46 biases cam 14 towards button 44 whereby distal end 34 rests upon sloped portion 50. Sloped portion 50 rotates clamping arm 12 to the clamp position and holds at that position. This metal to metal push results in a firm clamp position by elimination of any give or spring in the design thereof.

To change from the clamp position to the release position, button 44 is pushed firmly toward insert housing 13 which pushes cam 14 inwards against a cam spring 46. Distal end 34 of clamping arm 12 moves from sloped portion 50 to drop into trough 56 sloped portion via a sharp drop off 55. When distal end 34 reaches trough 56, cam 14 is in a fully disengaged position which allows clamping arm 12 to drop to the release position, said rotation being assisted by the clamping arm compression spring 36. As noted previously, clamping arm compression spring 36 holds clamping arm 12 in the release position thereby allowing the user to simply remove old cutter insert 16 and replace with a new cutter insert 16 (or simply rotate old insert to bring a new cutting surface to bear).

It should also be noted that such the use of trough 56 fall off holds the clamp portion far enough away to allow easy removal of same and also now biases the device to the removal position for "hands free" operation Also, the steepness of drop off 55 controls the force needed to return to the clamp position.

To return to the clamp position, the user simply presses downwardly on clamp portion 22. The resistance of clamping arm compression spring 36 is overcome and distal end 34 of clamping arm 12 re-engages the sloped portion 50 of cam 14 to push, with assistance from cam spring 46. Cam 14 is then back to a fully clamped position for cutter insert 16 use. The force needed to return to the clamp position is controlled by the angle of drop off 55. In some usages, for example, very high horsepower, small angles are desired whereby the operator must operate button 44 prior to, and while pressing downwardly on clamp portion 22 to reengage to reduce jamming caused by small angles.

However, when small angles are used, it has been found that when distal end 34 needs to be removed, the need to overcome the static friction of the distal edge 34 may cause jams when the angle Θ is small. However, once static friction is overcome and distal edge 34 begins to move, the lesser moving friction usually allows that movement to continue.

To compensate, sloped portion 50 is provided with a shim 60 for suitable applications. In this embodiment, shim 60 is mounted into a existing wedge 62 having an angle Φ with cam 14. Shim 60, when placed on the existing wedge 62, has an angle Θ with the horizontal which is less than Φ. A rear shoulder 64 and a front shoulder 66 limit longitudinal movement of shim 60. An optional slide plate 70 can be inserted between the existing wedge 62 and the shim 60 insert to increase or decrease the friction between those pieces as desired.

To engage mounting arm 12 with cutter insert 16, cam 14 moves longitudinally in the direction of button 44 causing distal end 34 to eventually drop into trough 56. The mechanical advantage is determined by angle Θ and rear shoulder 64 prevents shim 60 from moving away from distal end 34.

To disengage, pushing button 44 cause shim 60 to move longitudinally against compression spring 46. For the initial movement of shim 60, shim 60 slides down existing wedge 62 with the mechanical advantage is determined by the angle Φ, the larger angle. As noted, this larger angle Φ allows the wedge or shim to overcome static friction and begin movement much easier. In addition, the front shoulder 66 stops the movement of shim 60 but said shim 60 and distal end 34 are already moving after overcoming the static friction.

Although only certain embodiments have been illustrated and described, it will be apparent to those skilled in the art that various changes and modifications may be made therein without departing from the spirit of the invention or from the scope of the appended claims. For example, co-pending application Ser. No. 11/366,739, herein incorporated by reference, discloses a number of functional variants of the present invention which those skilled in the art will recognize are suitable for use in the an end mill.

What is claimed is:

1. An end mill having a plurality of quick change insert holders for cutter inserts on machine tools, each of the plurality of quick change tool holders comprising:
   a housing which is adapted to receive and conform to the shape of a cutter insert,
   a clamping arm mounted in the insert housing, the clamping arm movable in the insert housing, the clamping arm having a clamp portion extending over the cutter insert, the clamp portion adapted to engage the cutter insert, the clamping arm being mounted by axle and an elongated hole wherein when the clamping portion engages the cutter insert the elongated hole acts to pull the cutter insert firmly against the housing to provide a firm clamping position; and
   a locking mechanism completely contained within the housing, the locking mechanism having a clamp position which forces the clamp portion of the clamping arm to engage the cutter insert, the locking mechanism having a release position which forces the clamp portion to disengage from a cutter insert to allow removal and replacement of said cutter insert, the locking mechanism being movable between the release position and the clamp position.

2. The end mill of claim 1 wherein in each of the plurality of quick change tool holders the pivoting arm is biased to the release position by a pivoting arm spring which is positioned between the pivot and the distal end of the arm.

3. The end mill of claim 1 wherein each of the plurality of quick change tool holders further comprises a cam, the clamping arm having a distal end engaging the cam, the cam having a clamp position which forces the clamp portion of the pivoting arm to engage a cutter insert, the cam having a release position which forces the clamp portion to disengage from a cutter insert to allow removal and replacement of same, the cam movable between the release position and the clamp position.

4. The end mill of claim 3 wherein each of the cams includes a button at one end and a cam spring opposite said button, the cam spring biasing the cam to the clamp position.

5. The end mill of claim 3 wherein each cams of the plurality of quick change tool holders includes, intermediate between the button and the cam spring, a sloped portion which slopes inwardly from a shallow cut proximate to the cam spring to a deeper cut in the direction of the button, the cam further including a trough connected to the sloped portion by a drop off having a predetermined angle, the trough extending further into the cam from the deeper cut proximate to and towards the button, the cam spring biasing the cam towards the button whereby the distal end rests upon the sloped portion which rotates the pivoting arm to the clamp position, the predetermined angle controlling the force needed to move from the release position to the clamp position.

6. The end mill of claim 5 wherein for each of the plurality of quick change tool holders pushing the button toward the insert housing which pushes the cam inwards against the cam spring whereby the distal end of the pivoting arm moves from the sloped portion to the trough which allows the pivoting arm to rotate to the release position and whereby pressing downwardly on the clamp portion overcomes the bias of the pivoting arm to the release position to allow the distal end to again engage the sloped portion in the clamp position.

7. The end mill of claim 5 wherein for each of the plurality of quick change tool holders the sloped portion is provided with a shim which is mounted into an existing wedge having an angle Φ with the cam, the shim having an angle Θ with the cam which is less than Φ, the cam having a rear shoulder and a front shoulder which limit longitudinal movement of the shim, whereby to engage the clamping arm with the cutter insert, the cam moves longitudinally with the mechanical advantage being determined by the angle Θ, and to disengage the mounting arm from the cutter insert, pushing the button causes the shim to move longitudinally, the shim sliding down the existing wedge with the mechanical advantage being determined by the angle Φ.

8. The end mill of claim 7 wherein each of the plurality of quick change tool holders further includes a slide plate inserted between the existing wedge and the shim, the slide plate being adapted to alter the frictional forces between the existing wedge and the shim as desired.

9. An end mill having a plurality of quick change insert holders for cutter inserts on machine tools, each of the plurality of quick change tool holders comprising:
   a housing which is adapted to receive and conform to the shape of a cutter insert,
   a clamping arm mounted in the insert housing, the clamping arm movable in the insert housing, the clamping arm having a clamp portion extending over the cutter insert, the clamp portion adapted to engage the cutter insert, and
   a cam contained with the housing, the clamping arm having a distal end engaging the cam, the cam having a clamp position which forces the clamp portion of the pivoting arm to engage the cutter insert, the cam having a release position which forces the clamp portion to disengage from the cutter insert to allow removal and replacement of same, the cam manually movable between the release position and the clamp position by locking mechanism completely contained within the housing, the locking mechanism having a clamp position which forces the clamp portion of the clamping arm to engage the cutter insert, the pivoting arm is biased to the release position by a pivoting arm spring which is positioned between the pivot and the distal end of the arm, the cam including a button at one end and a cam spring opposite said button, the cam spring biasing the cam to the clamp position, the cam including, intermediate between the button and the cam spring, a sloped portion which slopes inwardly from a shallow cut proximate to the cam spring to a deeper cut in the direction of the button, the cam further including a trough connected to the sloped portion by a drop off having a predetermined angle, the trough extending further into the cam from the deeper cut proximate to and towards the button, the cam spring biasing the cam towards the button whereby the distal end rests upon the sloped portion which rotates the pivoting arm to the clamp position, the predetermined angle controlling the force needed to move from the release position to the clamp position.

10. The end mill of claim 9 wherein for each of the plurality of quick change tool holders pushing the button toward the insert housing which pushes the cam inwards against the cam spring whereby the distal end of the pivoting arm moves from the sloped portion to the trough which allows the pivoting arm to rotate to the release position and whereby pressing downwardly on the clamp portion overcomes the bias of the pivoting arm to the release position to allow the distal end to again engage the sloped portion in the clamp position.

11. The end mill of claim 9 wherein for each of the plurality of quick change tool holders the sloped portion is provided with a shim which is mounted into an existing wedge having an angle $\Phi$ with the cam, the shim having an angle $\Theta$ with the cam which is less than $\Phi$, the cam having a rear shoulder and a front shoulder which limit longitudinal movement of the shim, whereby to engage the clamping arm with the cutter insert, the cam moves longitudinally with the mechanical advantage being determined by the angle $\Theta$, and to disengage the mounting arm from the cutter insert, pushing the button causes the shim to move longitudinally, the shim sliding down the existing wedge with the mechanical advantage being determined by the angle $\Phi$.

12. The end mill of claim 11 wherein each of the plurality of quick change tool holders further includes a slide plate inserted between the existing wedge and the shim, the slide plate being adapted to alter the frictional forces between the existing wedge arid the shim as desired.

* * * * *